July 14, 1936.   A. P. ARMINGTON   2,047,762
TRAILER VEHICLE
Filed Dec. 22, 1934
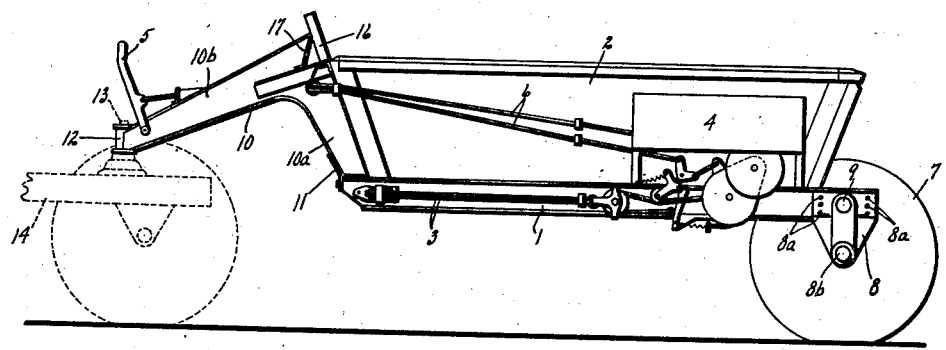
FIG.-1
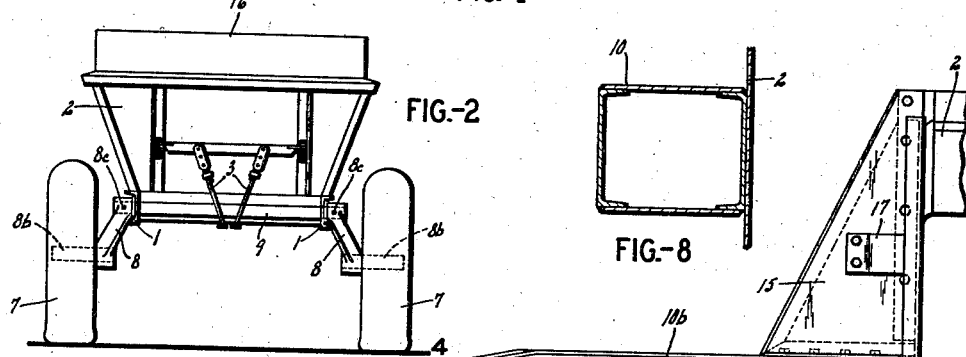
FIG.-2   FIG.-8
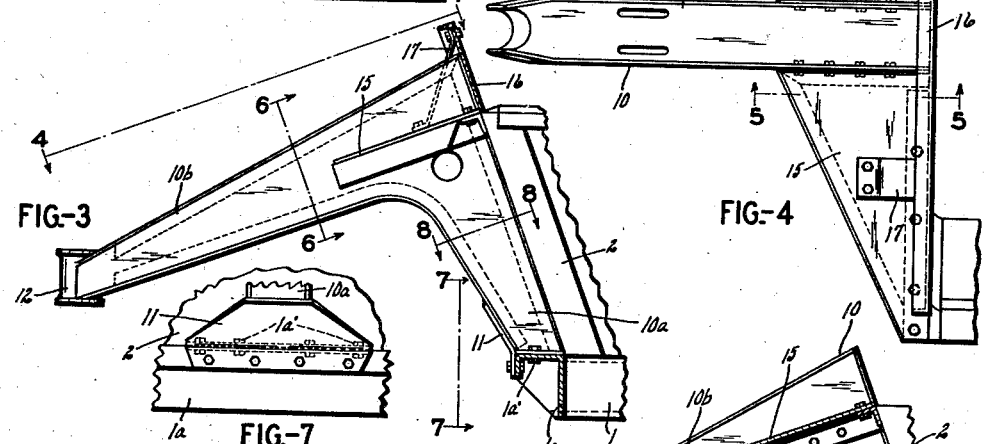
FIG.-3   FIG.-4
FIG.-7   FIG.-5
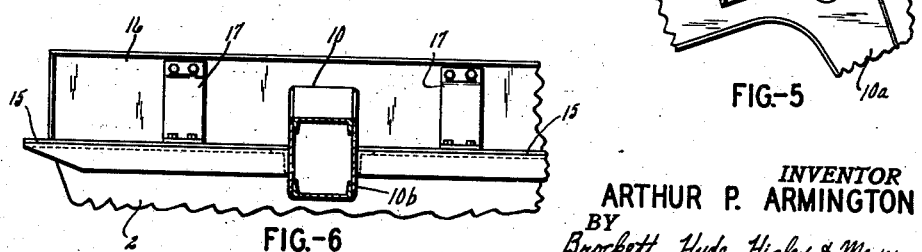
FIG.-6
INVENTOR
ARTHUR P. ARMINGTON
BY
Brockett, Hyde, Higley & Meyer
ATTORNEYS Patented July 14, 1936

2,047,762

UNITED STATES PATENT OFFICE 2,047,762

TRAILER VEHICLE

Arthur P. Armington, Willoughby, Ohio, assignor to The Euclid Road Machinery Company, Euclid, Ohio, a corporation of Ohio Application December 22, 1934, Serial No. 758,737

2 Claims. (Cl. 280—33.44)

This invention relates to large heavy-duty dump trailer vehicles adapted to transport excavated earth and the like, and more particularly the invention contemplates such a vehicle having a single pair of wheel means rearwardly located so that a substantial part of the load is carried by the tractor vehicle to which the trailer may be hitched.

An object of the invention is to provide that the load-carrying body of the trailer is disposed closely adjacent the tractor vehicle, so as to improve traction, yet without limiting steering operation. Another object is to provide improved clearance of the drawbar over the tractor wheels, especially to permit tilting of the trailer when the vehicles have sharp turning angularity.

Other objects of the invention are to provide a novel structural relationship between its principal parts, which include axle, frame, body, and drawbar parts, whereby the parts may best cooperate in resisting the stresses imposed upon them in operation. For these purposes the invention embraces an improved drawbar and a particular disposition thereof with reference to the parts with which it has connection.

The exact nature of this invention together with further objects and advantages thereof will be apparent from the following description taken in connection with the accompanying drawing, in which Fig. 1 is a side elevation of a characteristic embodiment of the invention, illustrated as with the near wheel removed, and indicating in broken lines parts of a tractor vehicle to which the illustrated trailer vehicle is hitched; Fig. 2 is a rear end elevation of the trailer vehicle appearing in Fig. 1; Fig. 3 is an enlarged side elevation of the drawbar appearing in Fig. 1; Fig. 4 is generally a plan view of the same, as from the line 4—4, Fig. 3; Fig. 5 is a sectional detail as in the plane of line 5—5, Fig. 4; Fig. 6 is a sectional detail as in the plane of line 6—6, Fig. 3; Fig. 7 is a detail in elevation as in the plane of line 7—7, Fig. 3; and Fig. 8 is a typical sectional detail through the drawbar, enlarged, as in the plane of line 8—8, Fig. 3.

With reference now to the drawing, the trailer vehicle illustrated, has a frame 1, generally rectangular and horizontally disposed, and a body 2 mounted thereon. The front end of the body is disposed to slope forwardly as indicated in Fig. 1, and in fact as here shown all four of the body sides have similar slope outwardly and upwardly of the frame. The body illustrated is provided with bottom dumping doors, opened and closed beneath the frame 1, which thus in effect comprises part of the body, by cables 3 actuated by winding gear generally designated at 4, under the control of levers 5 through lines 6, further details of the dumping mechanism being immaterial here.

The frame 1 is supported adjacent its rear end by a pair of wheels 7, one on each side, mounted on an upwardly arched axle structure as indicated in Fig. 2. This axle structure includes a pair of axle brackets 8, at their inner ends secured to the side frame members as by bolts or rivets 8a, and carrying at their outer ends stub shafts 8b upon which their wheels 7 bear. Extending transversely through the side frame members and fitting into suitable openings in the brackets 8, is a member 9. This member, which is preferably of circular section as indicated, is firmly secured in each of the axle brackets 8, as conventionally indicated by pins 8c, so that its function is not only to prevent spreading between the axle brackets 8 but also to be stressed in torque to resist warping of the frame.

The front end of the trailer vehicle is provided with centrally disposed rigid drawbar structure generally indicated at 10. The drawbar here shown is generally in the form of an L having inverted disposition, with a base part 10a and a tongue part 10b. The drawbar may be made up of sheet metal panels welded together to form a rigid integral structure, of characteristic box section as indicated in Figs. 6 and 8.

The base part 10a of the drawbar is firmly secured at its lower end to the forward frame member 1a as by bolts 1a' and gusset plate 11, indicated in Figs. 3 and 7 as welded to the drawbar and bolted to the frame member 1a. The base part 10a of the drawbar extends upwardly and somewhat forwardly from the frame member 1a, lying immediately ahead of the forward end of the body 2.

The tongue part 10b of the drawbar extends forwardly and somewhat downwardly from the upper extremity of its base part 10a and carries at its forward end a head 12 having a vertical opening adapted to fit about an upright draft post 13, carried by a tractor vehicle conventionally indicated at 14. Such tractor hitch arrangement is more fully illustrated and described in my copending application for "Tractor hitch", Serial No. 756,501, filed December 7, 1934, but it may be noted here that the drawbar as described is arched to clear the rear wheels of the tractor in turning operations.

Brace means are provided to maintain the drawbar in its described relation with the body, and against lateral swinging motion. Such brace means might be simply tie rods, but are here shown as plates 15 extending laterally from the drawbar to form a truss along the upper extremity of the forward body end to the lateral extremities of the latter, such truss means obviously reinforcing the forward body end against inward or outward buckling, as well as serving to transmit lateral drawbar stresses, and rearward forces exerted by the drawbar, to the side members of the body 2. The truss braces 15 are reinforced by peripherally located angle irons as indicated in Figs. 3, 4, and 5. It is to be noted that the truss brace means are located wholly and substantially above the clearance arch formed by the drawbar base and tongue parts, each brace extending upwardly as it extends rearwardly and laterally.

An extension 16 is disposed across the front of the body as an upward continuation of the forward body end, and is braced by the upper extremity of the drawbar base part 10a and as shown by brackets 17 secured with the braces 15.

It will be evident that by the drawbar 10, so much of the weight of load in the trailer vehicle as is not carried by its rear wheels 7, is imposed upon the tractor vehicle 14, and that this will be a substantial part of the load. In thus supporting the load, the drawbar acts somewhat as a bellcrank: exerting a forward stress upon the frame 1 central of and with bending effect upon the forward frame member 1a, by which this force is transmitted to the side frame members; and coincidentally the drawbar exerts a rearward force at the upper portion of its base part 10a, which force is transmitted through the forward body end member, assisted by the braces 15, to the side members of the body, which in turn transmit and distribute their rearward forces to and along the side frame members, and these forces will be equal and opposite and constitute a couple. The forward body end having substantial forward slope, when the body is loaded there will be substantial weight of load effective forwardly as well as downwardly upon this forward body end, directly opposing the rearward forces imposed by the head part of the drawbar. All of the described forces will vary proportionally with the amount of load in the body.

It will be apparent that characteristics of my arrangement are that the drawbar include a tongue part extending slopingly forwardly and downwardly generally from the upper edge of the forward body end, with laterally distributed connection to the latter, and a base part rigidly associated with the tongue part adjacent the body end and extending downwardly to connection with the lower portion of the latter.

It is to be observed that the forwardly extending tongue part of the drawbar being narrow, and its associated truss brace means being elevated above the clearance arch under the drawbar, and extending upwardly coincidently as rearwardly and laterally, when the trailer vehicle is angularly disposed relative to the tractor, as in a sharp turn, lateral tilting of the trailer will not decrease its drawbar clearance over the tractor wheels.

What I claim is:

1. In a trailer vehicle of the class described and having a load-container body with a forwardly sloping front end, rigid drawbar means disposed in alignment with the body, and having a base part extending slopingly with said body end and secured thereto at the top and bottom portions thereof intermediate the lateral extremities of the latter, and a tongue part extending slopingly forwardly and downwardly from the upper extremity of said base part, each of said drawbar parts comprising an immediately connected continuation of the other whereby said parts together characterize an arch providing a crotch adjacent said forward body end, said drawbar having lateral truss brace means connected to said body end adjacent the upper lateral extremities thereof and extending therefrom to connections with said tongue part ahead of said crotch.

2. In a trailer vehicle of the class described and having a load-container body with a forwardly sloping front end, rigid drawbar means disposed in alignment with the body, and having a base part extending slopingly with said body end and secured thereto at the top and bottom portions thereof intermediate the lateral extremities of the latter, and a tongue part extending slopingly forwardly and downwardly from the upper extremity of said base part, each of said drawbar parts comprising an immediately connected continuation of the other whereby said parts together characterize an arch providing a crotch adjacent said forward body end, said drawbar having lateral truss brace means connected to said body end adjacent the upper lateral extremities thereof and extending therefrom slopingly forwardly and downwardly to connections with said tongue part ahead of said crotch.

ARTHUR P. ARMINGTON.